G. W. DONNING.
TYPE WRITER.
APPLICATION FILED MAY 3, 1909.
997,656.
Patented July 11, 1911.
5 SHEETS—SHEET 4.
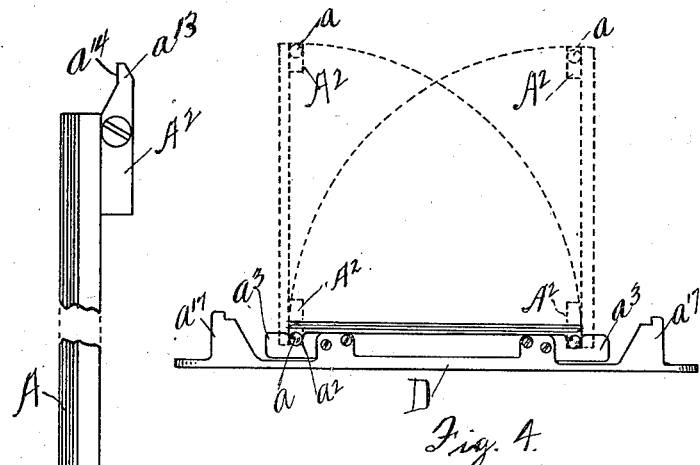
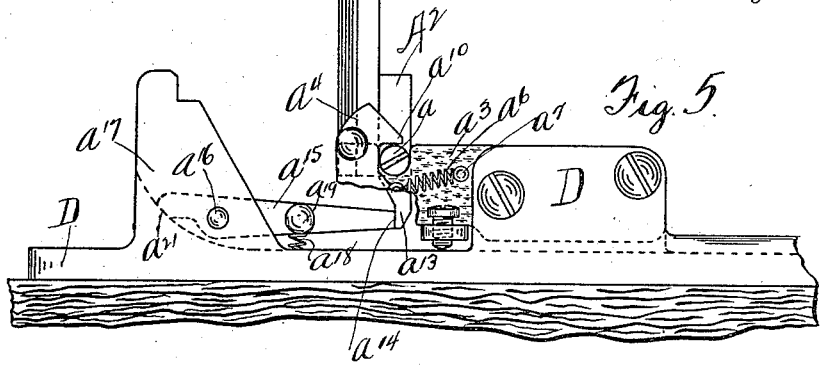
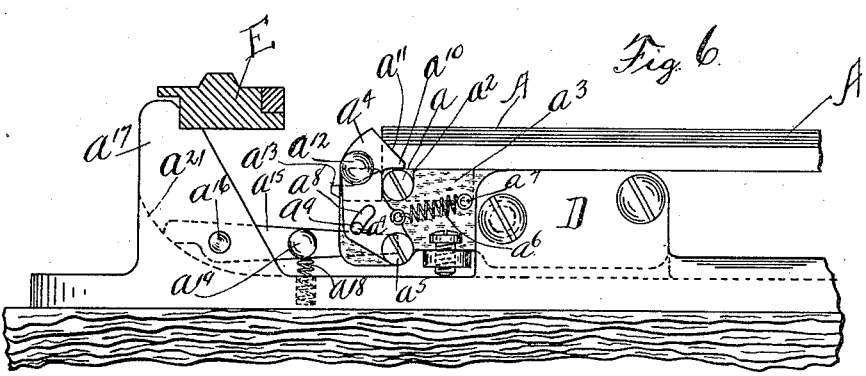
WITNESSES:
B. L. Miller.
G. M. Copenhaver.
INVENTOR
George W. Donning,
BY Edmund H. Parry
ATTORNEY

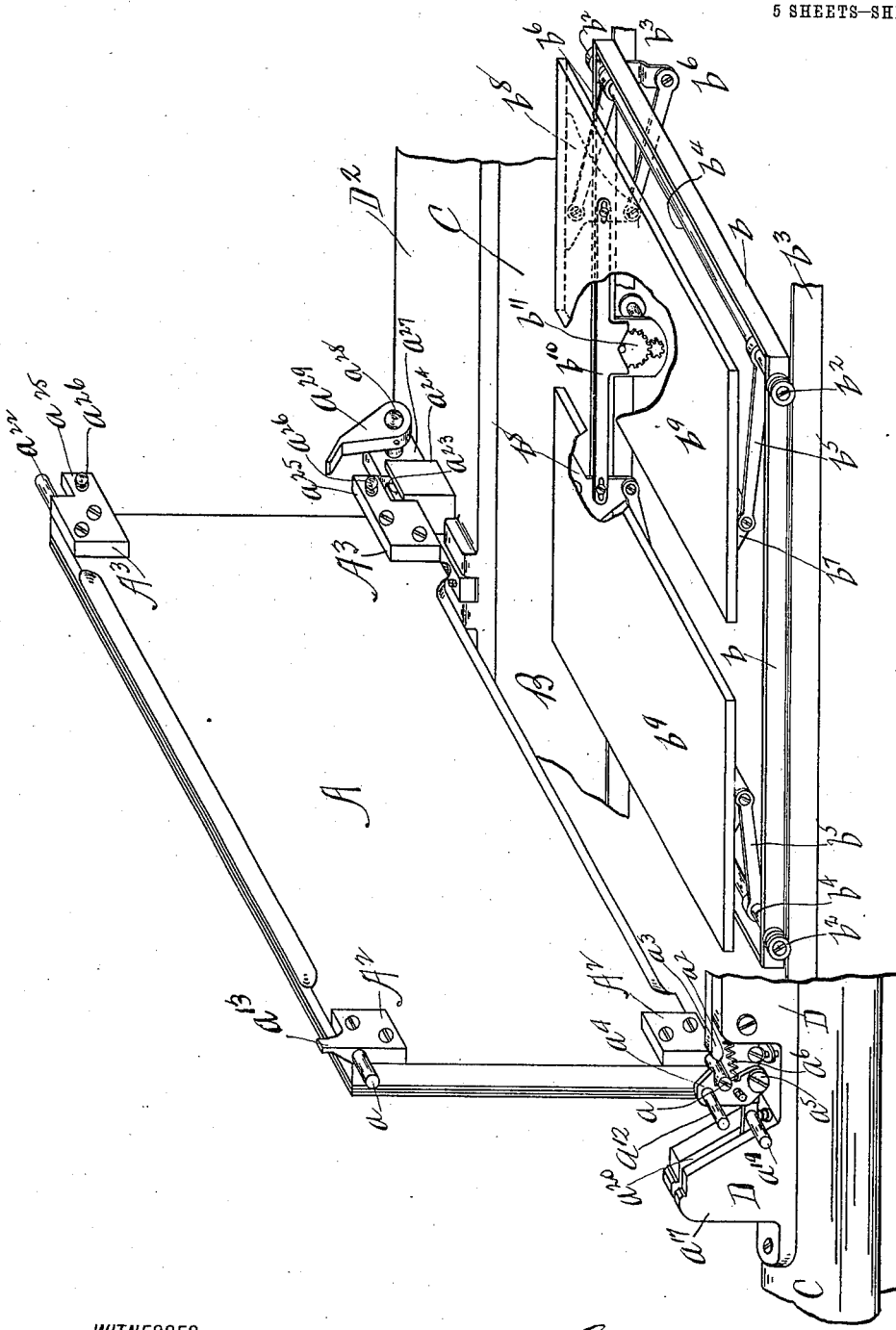

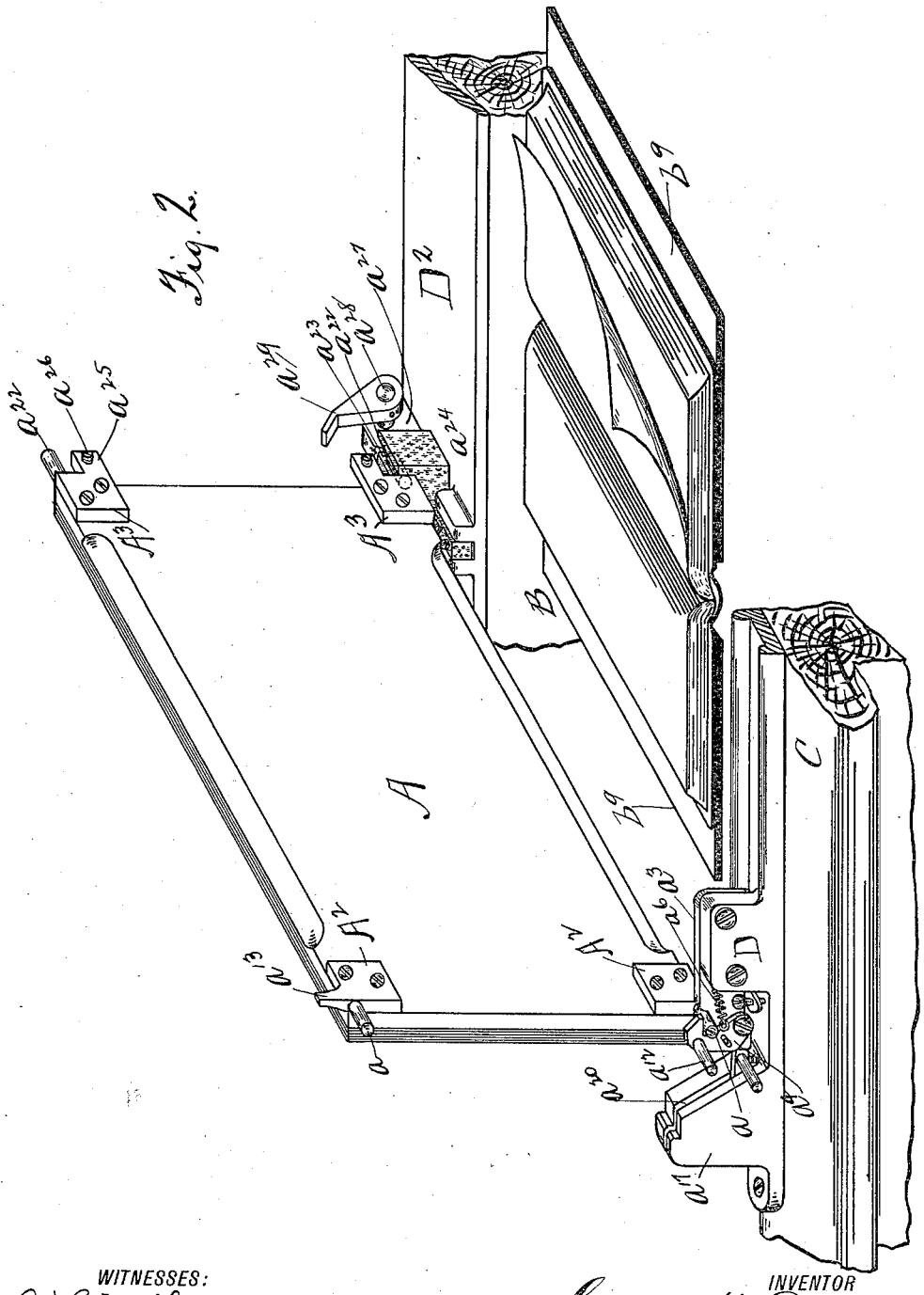

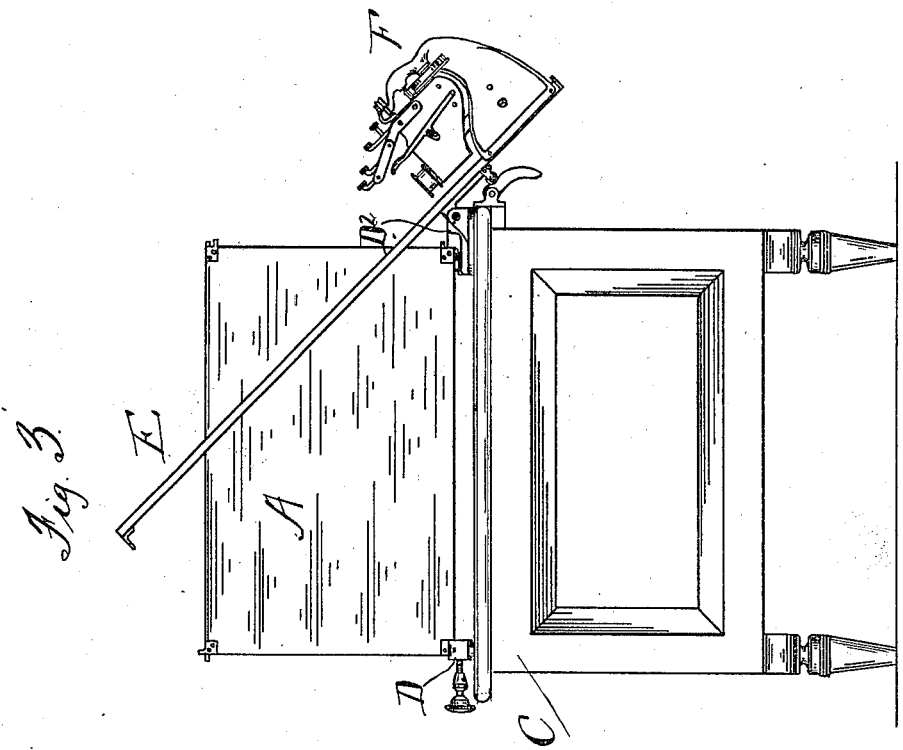

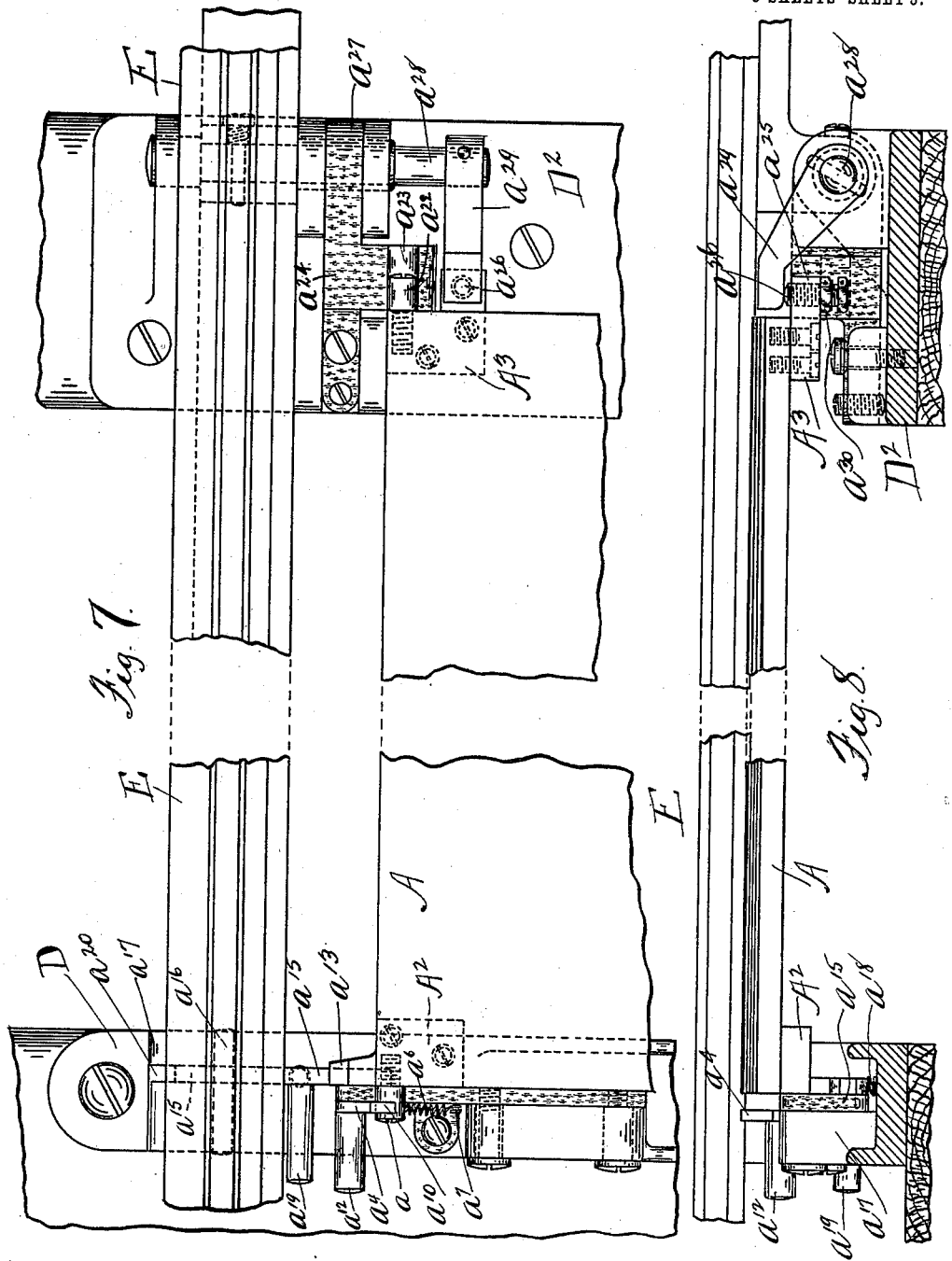

UNITED STATES PATENT OFFICE.

GEORGE W. DONNING, OF STAMFORD, CONNECTICUT, ASSIGNOR TO HARRY T. AMBROSE, OF ORANGE, NEW JERSEY.

TYPE-WRITER.

997,656.  Specification of Letters Patent.  Patented July 11, 1911.

Application filed May 3, 1909. Serial No. 493,487.

*To all whom it may concern:*

Be it known that I, GEORGE W. DONNING, a citizen of the United States, residing at Stamford, in the county of Fairfield and State of Connecticut, have invented certain new and useful Improvements in Type-Writers, of which the following is a specification.

This invention relates to typewriters, and, particularly, to that class thereof known in the art as book-typewriters.

The object of the invention is to present a means for supporting the flat-platen that is employed in book-typewriters, the same being of a simple form to facilitate manipulation thereof.

A further object is to provide means whereby said platen may readily be tilted away from the underlying book-support, thereby enabling access to the book-support to be had when desired or necessary.

A further object is to present a platen that may be entirely removed for whatever purpose necessary and, thus, to enable the interchanging therewith of another platen having a different character of operative surface, for instance,—interchanging a hard surfaced platen for one having a softer surface, the former being advantageously employed in connection with manifolding, and the latter form being more suitable for general purposes.

A further object is to provide what I shall herein designate a universally-tiltable platen for book-typewriters; that is, a platen that is capable of being tilted at either side, at the front, etc.

A further object is to provide means for locking and holding the platen rigidly in operable position, and means for holding the same in an elevated position.

With these and other objects in view, my invention resides, broadly, in a flat platen carrying means which are supported by the typewriter-table, or otherwise, whereby the platen may be tilted at any of its edges.

The invention resides, further, in means for tiltably connecting the platen to its support, said means being constructed and arranged to permit detachment of the platen from its support at one or more of its edges.

The invention resides, further, in means for tiltably connecting the platen to its support at its various edges or corners, said means being constructed and arranged so that the platen may be rigidly locked to, and easily unlocked from, the platen-support.

The invention resides, further, in means for locking the platen either in its normal or lower position and, also, in its tilted or abnormal position, and means for effecting a release of said platen from either of its locked positions.

The invention consists also in various novel details of construction and arrangement of the parts, all as will be made apparent hereinafter.

In the accompanying drawings, forming a part of this specification and in which like reference-characters designate corresponding parts throughout the several views, and in which some of the many possible forms of embodiment of the invention are illustrated, Figure 1 is a view in perspective of a machine embodying my improvement, and showing the book-carriage with its interdependent rising and falling leaves, and illustrating the platen as occupying its tilted or abnormal position; Fig. 2 is a similar view, the book-support being shown conventionally, and as supporting an open book; Fig. 3 is a view in side elevation of the machine, and showing the printing-mechanism carriages occupying a position at the rear of the track-frame (shown, in this instance, as tilted) and the platen being tilted to the side of the normal position of the track-frame; Fig. 4 is a view in front elevation showing in full lines the platen as occupying its lower or normal position, and in dotted lines, in its tilted positions on either side; Fig. 5 is an enlarged fragmentary view, in front elevation, showing, particularly, the platen as locked in its upraised or tilted position, and the locking and unlocking devices therefor; Fig. 6 is a similar view, but illustrating the platen as in normal position, and showing the platen locking and unlocking devices more clearly; Fig. 7 is a fragmentary view in plan, displaying the relation of the platen to the track, and the relative positions of the platen tilting connections and locking instrumentalities; and Fig. 8 is a view in side elevation thereof, partly in section.

Heretofore, it has been proposed to hinge the platen to its support at the rear to permit it to be swung upward away from the underlying book-support. My invention is to be distinguished therefrom, in that it is pivotally connected at a plurality of its edges so that it may be tilted toward the left, say, or toward the right, according as the exigencies or requirements, or location of the book and support, may demand. The form of pivotal connection is such that the platen may be released at one side at said connection and fulcrum at the opposite side, and vice versa. Such an arrangement has many advantages, as will be apparent to those familiar with structures of this character.

In the drawings: A designates the flat-platen, which may, itself, be of any desired form and having its writing surface provided with either a hard or a soft substance, according to the character of use to which it is to be subjected; or, either side may be the writing surface, and one side be provided with a standard surface and the other a hard surface. Underlying the platen is a book-supporting carriage B designed to travel laterally of the platen, and comprising a carriage-frame $b$ provided with rollers $b^2$, designed to travel on supporting-strips or tracks $b^3$. At either end of said frame is a rock-shaft $b^4$ upon which are leaf-supporting arms $b^5$ and $b^6$, $b^6$ connected at their extended ends to brackets $b^7$, $b^8$, and upon which are the book-supporting leaves or platforms $b^9$, $b^9$. Connecting with the brackets $b^8$ is an equalizer lever $b^{10}$ which is fulcrumed centrallly upon the vertical-adjusting device $b^{11}$. The movement of one leaf $b^9$ in one direction causes a movement of the other leaf in the opposite direction through the medium of the equalizer lever $b^{10}$. The vertical adjusting device $b^{11}$, aforementioned, operates to raise or lower the fulcrum of the lever $b^{10}$ and, in consequence, effects a raising or lowering of both leaves, $b^9$, $b^9$ simultaneously, all as fully set forth in my U. S. Patent No. 826,482, granted July 17th, 1906. By this arrangement of parts, I provide for the movement of the leaves in opposite directions in one instance, and, in the other instance, both leaves are moved in the same direction and simultaneously. The first operation is to effect a self-regulating lowering and raising of the leaves as the weight of the pages of the book increases on one side and decreases on the other. The other operation is to provide for different thickness of books. In both instances, the tendency may be to force one side of the book up under the lower face of the platen A, and, in order to prevent its displacement the platen-locking mechanism, presently to be described, is provided.

It will be understood that the book-supporting structure, just described, is disposed in a depression or carriage-way in the table C and occupies a position normally somewhat below the plane of the lower face of the platen, though one or the other of the leaves $b^9$ may be actuated upward and occupy a plane not much below said plane of the platen.

At the front and rear portions of the table and, thus, in advance and back of the book-carriage-way, are disposed, respectively, front and rear plates D, $D^2$, upon which the platen A and the track-frame E are respectively and separately supported in a manner and for a purpose presently to be explained. The track-frame is pivoted on the rear plate $D^2$ in any appropriate manner, and is supported and normally locked to the front plate in any desirable way. Preferably, the track-frame is pivoted intermediate of its ends so that its rearward-extending portion may be of sufficient length to support the writing-mechanism carriage F, as shown in Fig. 3, when disposed at its rearmost position on said track-frame.

The platen A is provided, preferably at its four corners, with blocks $A^2$, $A^3$ formed integral with the platen, or secured thereto in any desirable way. The front blocks $A^2$ are provided with a screw, stud or pintle $a$ which is designed normally to occupy a position in the groove $a^2$ (Figs. 1, 2 and 4) in an upstanding supporting-portion $a^3$ of the plate D. To retain the screw-stud $a$, and thus the platen, firmly in place and so that it cannot be displaced—especially while the opposite side of the platen is being swung upward,—I provide a latch-member $a^4$, (Fig. 6) pivoted at $a^5$ and controlled by a retractile spring $a^6$ connecting with it and with a screw $a^7$ in the portion $a^3$. The latch-member is provided with an elongated arcuate slot $a^8$ in which a pin $a^9$ carried by the portion $a^3$ slides, and which slot and pin serve to guide and limit the actuation of the latch. The upper end of the latch is provided with a nose $a^{10}$, being the termination of an inclined bearing-face $a^{11}$. It will be understood that when the platen is lowered from its tilted position, the screw-stud $a$ will strike the inclined bearing-portion $a^{11}$ of the latch $a^4$ and actuate the same away from its normal position at the same time, flexing the spring $a^6$. As soon as the stud slides over the nose $a^{10}$, the flexed spring $a^6$ quickly returns the latch to normal position and causes it to engage the stud $a$. The nose $a^{10}$ is so formed and is of such length that the stud cannot be displaced except when the latch is manually operated, but has now become firmly locked. Its position in the slot $a^2$ is such, however, that it may serve as a fulcrum when the platen is swung upward from the opposite side. It is to be understood that the arrangement just described is disposed on the opposite side of the platen. To enable the latch $a^4$ to be actuated by the operator, a knob or handle $a^{12}$ is provided thereon. I have, therefore, provided an automatically-operated locking device, and, likewise, a manually-operated device. The block $A^2$ is also provided with a lug $a^{13}$ extending at right angles to the stud $a$ and having an abutment-portion $a^{14}$. Arranged to engage with this abutment-portion is a short locking-lever $a^{15}$ pivoted at $a^{16}$ in the track-supporting portion $a^{17}$ of the front plate D, and maintained in normal position by a spring $a^{18}$. A thumb-knob or handle $a^{19}$ is disposed on the lever $a^{15}$. It will be seen that, when the platen is tilted from the opposite side, the lug $a^{13}$ will actuate the lever downward until said lug shall have reached a perpendicular position, approximately, when the free end of the lever $a^{15}$ will engage the abutment-portion $a^{14}$, whereupon the platen becomes locked in its tilted position. It will be apparent, now, that I have provided an automatic locking-device to hold the platen tilted with manually-operated means for releasing the lock. This locking-device can be released by manipulating the lever $a^{15}$ to effect its disengagement with the portion $a^{14}$. The pivot end of this lever operates in a cut-out portion or slot $a^{20}$ of the track-supporting portion 17, and is limited in its movement by engaging with the curved bottom $a^{21}$ of the cut-out. (Figs. 5 and 6).

The foregoing description applies to the means of mounting the platen at the forward end. I will now describe the structure by which, in this instance, the platen is supported and controlled at the rear in the movement of the platen when tilting.

As already specified, the platen is provided at the rear with blocks $A^3$, the same being, in some respects similar to, and in other respects different from, the front blocks $A^2$. Said blocks $A^3$ are provided with a screw-stud $a^{22}$, similar to the stud $a$ in the block $A^2$, and is designed to rest normally in a slot or groove $a^{23}$ in the upstanding portion $a^{24}$ of the back-plate $D^2$ (Figs. 1, 2 and 7). The block $A^3$ is also provided with a longitudinal projection or lug $a^{25}$ in which is threaded a headed screw $a^{26}$ which serves a function presently to be explained.
As shown in Fig. 7, the upstanding portion or block $a^{24}$ is provided with a rearward-extending portion $a^{27}$ in which is rotatably mounted a stub-shaft $a^{28}$ which, at one end connects with and is operated by the track E, and at its other end carries a retainer-arm $a^{29}$ fixed on said shaft and projecting toward the front of the platen. The operation and function of these last-mentioned parts will now be described: The platen A having been swung down to, or placed in, its normal position, the projection $a^{25}$ will lie in a horizontal plane, and the upper end of the headed screw $a^{26}$ will project slightly (or as much as necessary) above the upper surface of said projection $a^{25}$. The track-frame E then being lowered to normal position, the extending end of the arm $a^{28}$ will engage the upper end of said screw $a^{26}$, as shown in Figs. 7 and 8. By this construction, the rear end of the platen is locked in its lower position similarly as the forward end, only by different instrumentalities. When the track-frame is tilted, the arm is elevated away from the screw, thus leaving the platen to be tilted or removed. The screw $a^{26}$ can be made to project a greater or less distance above the surface of its supporting block, according to the required holding to be effected, and carries a locking nut $a^{30}$ to hold the screw from turning.

It is obvious that other forms of detachable-supporting and locking devices may be employed in lieu of those I have disclosed and be within the spirit of my invention. While two separate sets of means are shown (at the front) for locking in the normal and tilting positions, it is to be understood that I may employ a single device for accomplishing this dual function, and that, in lieu of the device utilized in the rear, a device similar to that applied to the front may be employed.

The broad idea herein disclosed is a universal platen in a double sense; first, it is interchangeable and, if desirable, both sides capable of use; secondly, a universally tiltable platen.

Having thus described my invention, what I claim and desire to secure by Letters Patent is:

1. In a typewriter, a base provided with a platen-holding device, in combination with a flat platen overlying the base, and means disposed adjacent a plurality of the edges of the platen and coöperating with said platen-holding device for normally holding the platen rigidly in its horizontal position, and detachable therefrom to permit tilting of said platen on one or another of its edges.

2. In a typewriter, a base provided with a plurality of platen-holding devices, in combination with a flat platen overlying the base, and means disposed adjacent a plurality of the edges of the platen and coöperating with said platen-holding devices for normally holding said platen at each of a plurality of its edges, and detachable therefrom to permit tilting of said platen on one or another of its said edges.

3. In a typewriter, a flat platen provided at a plurality of its edges with base-engaging members, a base underlying the platen, and platen-holding devices disposed on said base and adapted to engage with said base-engaging members when the platen is in its horizontal position and to be disengaged from part of said base-engaging members to permit tilting of the platen and from all of said members to permit removal thereof.

4. In a typewriter, a base, a laterally-traveling book-support supported by and in the base, a platen, platen-supporting means carried by the base, and means carried by each of a plurality of the edges of the platen and coöperating with platen-supporting means for tiltably supporting the platen.

5. In a typewriter, a base, a book-support traveling on said base, platen-supporting and locking means carried by the base, a flat platen normally overlying at least a portion of the book-support, and means carried by each of a plurality of edges of the platen and coöperating with the platen-supporting means for effecting a tilting supporting and locking of the platen.

6. In a typewriter, a base, a book-support traveling on said base, platen-supporting and locking means carried by the base, a tiltable flat platen carrying at a plurality of its edges means for engagement with said platen-supporting and locking means, and separate means for locking the platen when tilted.

7. In a typewriter, a base, a laterally traveling book-support sustained by said base, platen-supporting means carried by said base, automatically-operating platen-locking means, a flat platen tiltably supported in said platen-supporting means, and manually-operated means for actuating said platen locking means to unlock the platen.

8. In a typewriter, a base, platen-supporting means carried by said base, automatically-operating platen-locking means carried by the base, a flat platen tiltably sustained by said platen-supporting means and arranged to actuate said locking means, when assuming normal position, and manually-operated means for actuating said locking means to release the platen.

9. In a typewriter, a base, platen-supporting means carried by said base, automatically-operating platen-locking means carried by the base, a flat platen tiltably sustained by said platen-supporting means and arranged to actuate said locking means, when assuming normal position, manually-operated means for actuating said locking means to release the platen, and independent automatically-operated means for locking the platen in its tilted position.

10. In a typewriter, a base, platen-supporting means carried by said base, automatically-operating platen-locking means carried by the base, a flat platen tiltably sustained by said platen-supporting means and arranged to actuate said locking means, when assuming normal position, manually-operated means for actuating said locking means to release the platen, independent automatically-operated means for locking the platen in its tilted position, and manually-operated means for actuating said last-mentioned locking means to release the platen and permit it to return to normal position.

11. In a typewriter, a base, platen-supporting-means carried by said base, automatically-operating platen-locking means carried by the base, a flat platen tiltably sustained by said platen-supporting means and arranged to actuate said locking-means, a track arranged relative to the platen, and track-operated platen locking-means.

12. In a typewriter, a base, projection-receiving members disposed on said base, a flat platen overlying said base, and projections disposed at a plurality of edges of said platen and adapted to engage with said projection-receiving members on the base, whereby the platen is normally held rigidly in its horizontal position and, when said projections are disengaged from said receiving members, permitting said platen to be tilted on one or another of its edges.

13. In a typewriter, a base, projection-receiving members disposed on said base, a flat platen overlying said base, projections disposed at a plurality of edges of said platen and adapted to engage with said receiving-members on the base, whereby the platen is normally held rigidly in its horizontal position and, when said projections are disengaged from said receiving-members, permitting said platen to be tilted on one or another of its edges, and means for locking said platen to the base.

14. In a typewriter, a base, projection-receiving members disposed on said base, a flat platen overlying said base, projections disposed at a plurality of edges of said platen and adapted to engage with said receiving-members on the base whereby the platen is normally held rigidly in its horizontal position and, when said projections are disengaged from said receiving-members, permitting said platen to be tilted on one or another of its edges, and means for locking said platen in its normal position and in its tilted position.

15. In a typewriter, a base, projection-receiving members disposed on said base, a reversible flat platen overlying said base, and projections disposed at a plurality of edges of said platen and adapted to engage with said receiving-members on the base, whereby the platen is normally held rigid in its horizontal position and, when said projections are disengaged from said receiving-members, permitting said platen to be detached from the base and reversed.

16. In a typewriter, a base, interchangeable-platen projection-receiving members disposed on said base, a flat platen overlying said base, and projections disposed at a plurality of edges of said platen and adapted to engage with said interchangeable-platen projection-receiving members on the base, whereby the platen, when in normal position, is rigidly held against movement, and, when said projections are disengaged from said projection-receiving members, permitting detachment of said platen therefrom.

17. In a typewriter, a supporting base, a flat platen overlying the same, said base and platen being provided with a plurality of complementary separable extension and socket members constituting a platen-supporting and retaining device, whereby said platen may be rigidly held in normal position and also be tilted on one or another of its plurality of edges.

18. In a typewriter, a supporting base and a flat-platen overlying the same, said base and platen each carrying a plurality of complementary separable interlocking-members, co-acting to hold said platen rigidly in normal position and, when disengaged, permitting said platen to be tilted away from the base on one or another of the edges of the platen.

19. In a typewriter, a supporting base, and a flat platen overlying said base, and a plurality of separable complementary interlocking members carried, respectively, by said base and by said platen at a plurality of its edges, whereby the platen may be rigidly held in its horizontal position and also be permitted to tilt on one or another of its edges when released at the opposite edge.

20. In a typewriter including a writing-mechanism adapted to travel in two directions, a support, a flat platen overlying the support and relatively stationary during the operation of writing and the traveling of the writing-mechanism, and a plurality of interlocking means relatively disposed to each other and coöperating to attach the platen to the support at a plurality of points thereon and permitting swinging of the platen in a plurality of directions relatively to the support.

21. In a typewriter including a traveling writing-mechanism, a support, a flat platen overlying the same and normally stationary relatively to the traveling writing-mechanism, and a plurality of pivotal interlocking means to attach the platen to said support and to permit tilting of the platen on one or another of a plurality of axes.

22. In a typewriter, a support, a flat platen overlying the same, a plurality of pivotal interlocking means to attach the platen to the support at a plurality of points thereon, said locking means being manually operated when the platen is to be moved in one direction and automatically operated when it is moved in the opposite direction.

23. In a typewriter, a support, a flat tiltable platen overlying the same, a plurality of interlocking means relatively disposed to each other and adapted to attach the platen to the support at a plurality of points thereon, and means for retaining the platen in a raised position when tilted.

24. In a typewriter, a support, a flat tiltable platen overlying the same, a plurality of pivotal interlocking means to attach the platen to the support, and means for holding the platen in a raised position when tilted.

25. In a typewriter, a support, a flat platen overlying the same, and a plurality of interlocking means to attach the platen to the support at a plurality of points thereon, said interlocking means being operated manually when the platen is moved in one direction, and automatically operated when the platen is moved in the opposite direction.

26. In a typewriter, a support, a flat platen overlying the same, a plurality of interlocking means to attach the platen to the support at a plurality of points thereon, a base-frame arranged in juxtaposition to the platen, and a locking device independent of the interlocking means, and operated by the base-frame to lock the platen in normal position.

27. In a typewriter, a support, a flat platen overlying the same, a plurality of interlocking means to attach the platen to the support at a plurality of points thereon, and a locking device independent of the interlocking means and adapted to lock the platen in normal position.

28. In a typewriter including a traveling writing mechanism, a support, a flat platen overlying the same and normally stationary relatively to the traveling writing-mechanism, and a plurality of pivotal interlocking means to attach the platen to said support, certain of said plurality of interlocking means being operable automatically.

In testimony whereof I hereunto affix my signature, in presence of two witnesses.

GEORGE W. DONNING.

Witnesses:
W. L. BILLMYER,
CHAS. P. BATT.

Copies of this patent may be obtained for five cents each, by addressing the "Commissioner of Patents, Washington, D. C."